Feb. 14, 1967  G. B. BOSCO, JR., ET AL  3,304,450
AXIAL AIRGAP DYNAMOELECTRIC MACHINE
Original Filed Aug. 12, 1960  10 Sheets-Sheet 1

INVENTORS
GEORGE B. BOSCO, JR.
HOWARD E. CORBITT
BY
D. Gordon Angus
ATTORNEY

INVENTORS
GEORGE B. BOSCO, JR.
HOWARD E. CORBITT
BY
ATTORNEY

Feb. 14, 1967  G. B. BOSCO, JR., ET AL  3,304,450
AXIAL AIRGAP DYNAMOELECTRIC MACHINE
Original Filed Aug. 12, 1960  10 Sheets-Sheet 5

INVENTORS
GEORGE B. BOSCO, JR.
HOWARD E. CORBITT
BY
ATTORNEY

Feb. 14, 1967    G. B. BOSCO, JR., ET AL    3,304,450
AXIAL AIRGAP DYNAMOELECTRIC MACHINE
Original Filed Aug. 12, 1960    10 Sheets-Sheet 6
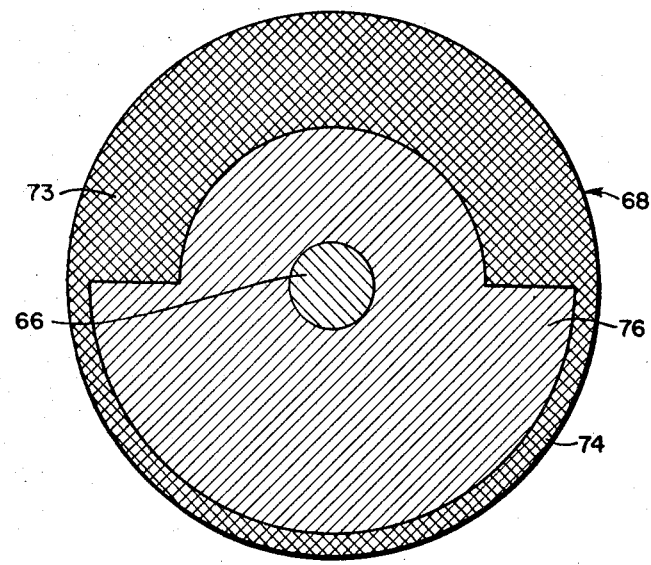
*Fig-III*
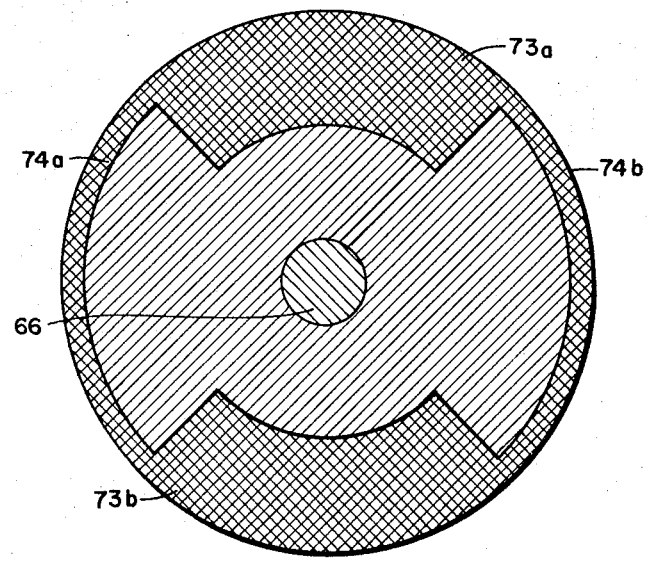
*Fig-IIIa*
INVENTORS
GEORGE B. BOSCO, JR.
BY HOWARD E. CORBITT
ATTORNEY

INVENTORS
GEORGE B. BOSCO, JR.
HOWARD E. CORBITT
ATTORNEY

Feb. 14, 1967     G. B. BOSCO, JR., ET AL     3,304,450
AXIAL AIRGAP DYNAMOELECTRIC MACHINE
Original Filed Aug. 12, 1960     10 Sheets-Sheet 9
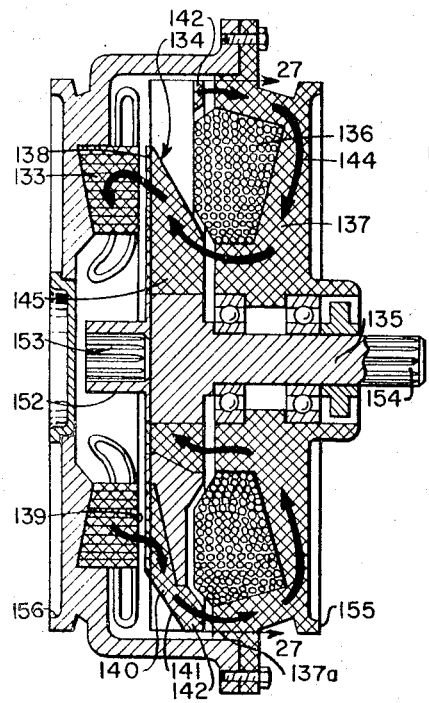
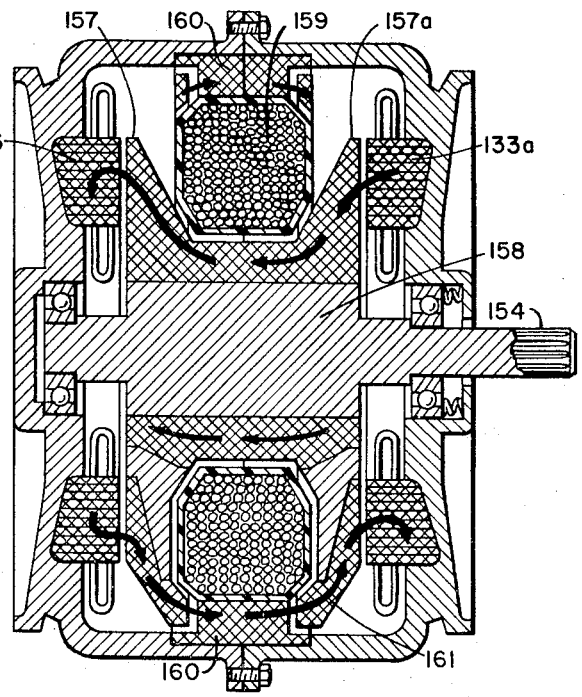
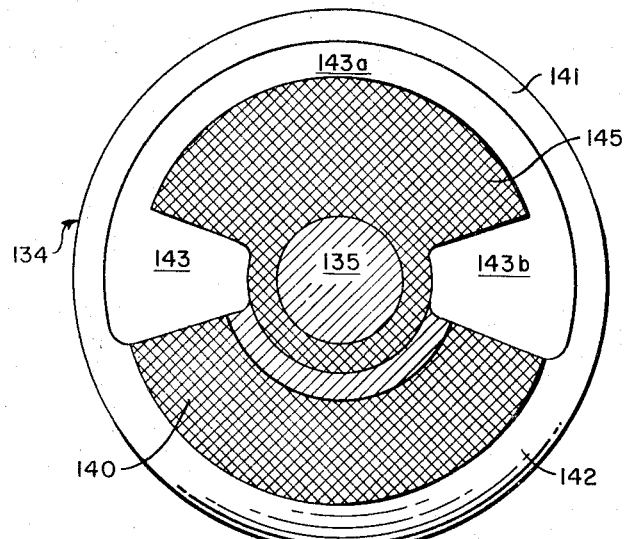
INVENTOR.
GEORGE B. BOSCO, JR.
HOWARD E. CORBITT
BY
D. Gordon Angus
ATTORNEY Feb. 14, 1967 G. B. BOSCO, JR., ET AL 3,304,450
AXIAL AIRGAP DYNAMOELECTRIC MACHINE
Original Filed Aug. 12, 1960 10 Sheets-Sheet 10

INVENTORS
GEORGE B. BOSCO, JR.
HOWARD E. CORBITT
BY
ATTORNEY

United States Patent Office 3,304,450
Patented Feb. 14, 1967

3,304,450
AXIAL AIRGAP DYNAMOELECTRIC MACHINE
George B. Bosco, Jr., Whittier, and Howard E. Corbitt, Arcadia, Calif., assignors to Aerojet-General Corporation, Azusa, Calif., a corporation of Ohio
Original application Aug. 12, 1960, Ser. No. 56,080, now Patent No. 3,261,998, dated July 19, 1966. Divided and this application Apr. 1, 1965, Ser. No. 465,221
9 Claims. (Cl. 310—126)

This invention relates to brushless dynamoelectric machines and has for an object to provide such machines capable of high performance and reliability and long life and which can be built in a relatively small size and low weight and low cost.

This application is a division of our copending application Serial No. 56,080, filed August 12, 1960, now Patent No. 3,261,998, for "Device."

Alternating current dynamoelectric machines, used either as motors or generators, are well known in the art. They commonly comprise a stator and a rotor mounted on a shaft which rotates relative to the stator. According to one known class of alternating current dynamoelectric machine, the stator has a core of magnetic material provided with an electrically conductive armature winding; and the rotor, also comprising magnetic material, rotates in close relation to the stator core. To provide the necessary magnetic flux, there is provided a field winding which sends the flux in a path through the magnetic material of both the rotor and stator. When the shaft of such a machine is power driven, the magnetic flux, as it is moved by the moving rotor, cuts the armature winding and thereby generates an alternating voltage in the armature winding which is taken as the output voltage of the machine. Conversely, when voltage from an external source is applied to the armature winding, the rotor is driven as a motor at least after it is brought up to the proper speed. In such a machine, no slip rings or brushes are required, because both the armature and field windings are stationary and there are no windings on the rotor.

In accordance with the present invention, there is provided a brushless machine of this general class which is featured by a rotor spaced from the stator armature by an axial air gap. This axial air gap can be provided by use of a rotor in the form of a disc or of a pole means providing the axial air gap. The rotor disc has at least one of its sides juxtaposed to a stator core provided with an armature winding with a narrow axial air gap between faces of the stator and of the rotor.

A feature of some of the embodiments of the rotor construction resides in the fact that only part of the area of the rotor disc or pole means is occupied by magnetic material, the remainder being composed of non-magnetic material. By virtue of this construction, the magnetic field between rotor and stator is caused to rotate with the rotor.

Machines within the scope of this invention may be said to fall into two general classifications which for convenience will be referred to as (a) the synchronous class; and (b) the inductor class. It should be understood that both of these two classes are within the broader category generally referred to as synchronous machines, in that there is a definitely established relation between speed of rotation and frequency of voltage at the armature winding. In an inductor machine, however, the useful flux cutting the armature conductors undulates in value but does not reverse in polarity as is true in a truly synchronous machine.

The term "inductor" as used to denote category (b) herein, should not be confused with the general class of so-called induction machines or motors, which commonly comprise a squirrel cage rotor in which current is induced, and which has a "slip" inherent in its operation. The special term "inductor" as used herein signifies that the rotor disc is provided with a pole or poles of magnetic material which are all of one polarity, for example, all north poles or all south poles, so that the space away from the pole or poles of the disc is inactive for the purpose of sending flux into the stator core. Where a rotor having two discs is used with one stator in an inductor machine the pole or poles of one disc would have one polarity and the pole or poles of the other disc would have the opposite polarity. The term "synchronous" as used herein to designate the special class of machines in category (a) signifies that the rotor disc or discs are provided with poles of opposite polarity.

The foregoing and other features of the invention will be better understood from the following detailed description and accompanying drawings of which:

FIG. 10 shows a cross-section view of a rotor disc used in the structure of FIG. 9 taken at line 12—12 of FIG. 9;

FIG. 10a is a cross-section view of another form of rotor disc which can be used in place of that in FIG. 9;

FIG. 17 is a cross-section view of a form of synchronous-type machine according to this invention, provided with a splined shaft so that a plurality of units may be joined in tandem;

FIG. 18 is a cross-section view taken at line 27—27 of FIG. 17 showing a rotor disc;

FIG. 19 is a cross-section view of a synchronous-type machine according to this invention, having two rotor discs and having a shaft adapted to be connected in tandem with another unit.

Figure 1:
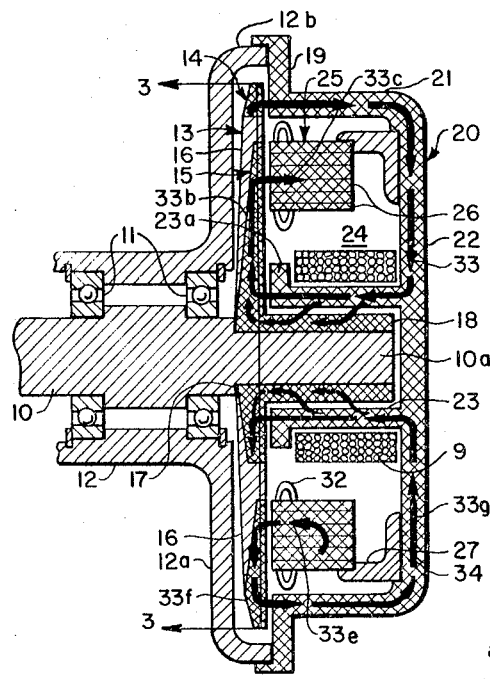
FIG. 1 is a cross-section view of a synchronous type machine according to the present invention.
Figure 2:
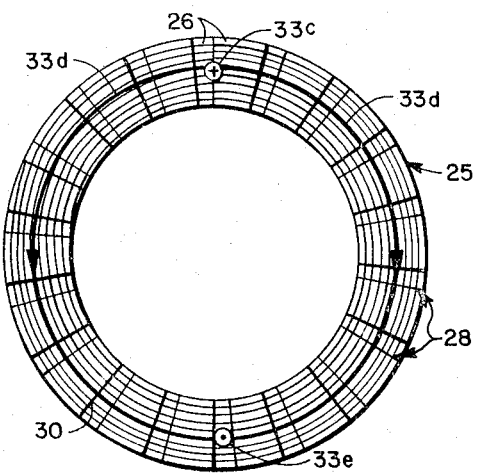
FIG. 2 is a face view of a stator core used in the structure of FIG. 1.
Figure 3:
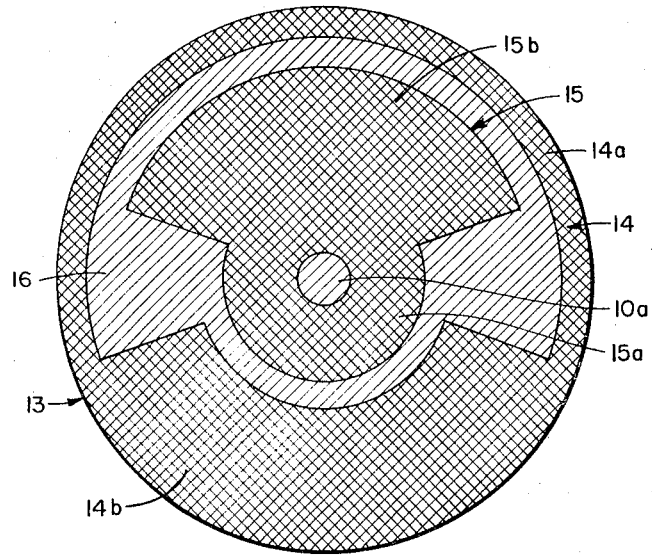
FIG. 3 is a cross-section view of a rotor disc used in the structure of FIG. 1 taken at line 3—3 of FIG. 1.

Referring to the drawings, there is shown in FIG. 1 to FIG. 3 an embodiment of the invention comprising a shaft 10 rotatable in ball bearings 11 mounted on a stationary supporting frame 12. There is fastened to the shaft a circular disc 13 at the overhung end of the shaft to the right of bearings 11, and this disc is constructed as shown in the face view of the same disc in FIG. 3. In FIGS. 1 and 3, as well as in all other figures in this application, it will be understood that in the sectional views the portions represented by diagonal lines slanting in only one direction are composed of non-magnetic material, and that the portions represented by two sets of diagonal lines, one set of which slants in one direction while the other set slants in the other direction and intersects the first set of slant lines, is composed of magnetic material. Thus, the shaft 10 and frame 12 are non-magnetic material; and in the disc 13, there are portions 14 and 15 of magnetic material and a portion 16 of non-magnetic material. For the purpose of supporting the disc, the shaft 10 is shouldered at 17 to provide an overhung section 10a of the shaft which is of smaller diameter than the portion of the shaft 10 at the bearings. The magnetic element 15 has a portion 15a which surrounds shaft portion 10a and abuts the shoulder 17; and the portion 15a is formed into a cylindrical sleeve portion 18 of magnetic metal which is fitted around shaft portion 10a. The element 15 also has an enlarged portion 15b in the disc at one side of shaft 10 but not extending to the periphery of the disc; and portion 15b extends through an angular area or region of almost a semi-circle. The magnetic metal 14 extends completely around the periphery of the disc in a relatively thin circumferential strip 14a; and at the side of the shaft 10 opposite the region 15b, the portion 14 is enlarged to form a region 14b which extends from the periphery in toward the shaft and close to but not contacting the region 15a; and region 14b covers an angular area of almost a semi-circle. The elements 14 and 15 are magnetically separated from each other by the non-magnetic material 16 which forms a closed circuitous path around the shaft 10 and completely separating all parts of elements 14 and 15 from each other. Material 16 may be either electrically conductive or non-conductive.

From FIG. 1 it is seen that the face of elements 14 and 15 as viewed from the right side of FIG. 1 is perpendicular to the axis of rotation of the disc and is substantially in the form shown in FIG. 3 since the cross section of FIG. 3 is taken close to this face. But as viewed from the other face of the disc, that is, from the left side of FIG. 1, the appearance of elements 14 and 15 is somewhat different from what appears in FIG. 3, because the surface of element 15 tapers somewhat from a position close to the right-hand face of the disc (as viewed in FIG. 1) to the shoulder 17 of the shaft; and the enlarged section 14b also has a tapered surface, this taper being from a position near the circular periphery of the disc as viewed from the left side of FIG. 1 to a position near the right-hand surface of the disc. The right-hand and left-hand sides of the disc are almost parallel to each other, and the space in the disc resulting from the tapers of the surfaces of portions 14 and 15 are filled in with the non-magnetic material 16.

The frame member 12 of non-magnetic material is formed into an annular portion 12a which extends close to but not touching the left face (as viewed in FIG. 1) of the disc, and extending beyond the periphery of the disc where it is curved over to form a flange 12b which extends to a position just to the right of the right face of the disc (as viewed in FIG. 1) the end of which forms an annulus to which there is fastened the annular shoulder 19 of a dish-like member 20 of magnetic material which has an outer cylindrical portion 21 carried to a circular end portion 22. The attachment of portions 12b and 19 together serves to close a housing which encloses the disc; and rotation of the shaft enables the disc to rotate within the housing as a rotor.

At a central position, the end portion 22 has formed or attached to it an inwardly extending cylindrical portion 23 also of magnetic material. The cylindrical portion 23 is concentric with shaft 10 and cylindrical sleeve 18 and it surrounds this sleeve with enough clearance so that sleeve 18 does not quite touch it; and the cylindrical portion 23 extends almost to the disc where it terminates in a collar 23a with clearance between the collar and the adjacent face of the disc.

Figure 2A:
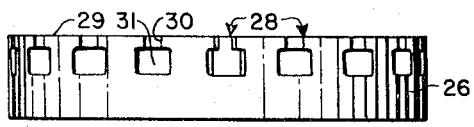
FIG. 2a is an end view of the stator of FIG. 2.

The construction just described forms an annular chamber 24 formed by the disc 13 and the portions 21, 22 and 23 of the member 20; and this chamber is enclosed except for the very narrow axial air gap between stationary member 19 and the portion of the disc face juxtaposed to it. Within this chamber there is fixed a toroidal stator armature 25. As shown in FIGS. 2 and 2a, this armature has a core of magnetic material formed of laminations 26 of magnetic material, the laminations being tightly fitted together. This armature core is preferably formed by winding a ribbon of the magnetic material in a tightly packed helix, the adjacent turns of which constitute the successive laminations. The armature core is supported by a suitable support 27 of non-magnetic material to, and spaced from, the stationary member 22.

The laminated armature core is provided with radial slots 28 along the face 29 of the core which faces and which has a slight clearance from the right-hand face of disc 13. These slots 28 are in the form of relatively narrow radially extending openings 30 which open up into enlarged radially extending openings 31 located further within the armature core. These core slots are for the usual purpose of supporting and containing armature windings 32. As can readily be seen from FIG. 2, the conductors of the armature winding in the slots extend transversely across a concentric circle (for example circle 33d) passing through them so that the conductors in the slots can be cut by a rotating flux. The turns of the windings are pushed through the entrance openings 30 and into the enlarged openings 31 so that each of the slots contains one or more convolutions of the windings. The particular type of winding is no part of the present invention, as the windings can be single-phase or multiphase as desired; and since the art of winding armature cores is well understood, no further description is needed here.

For the purpose of creating the magnetic field of the machine, there is provided a field winding 9 around the cylindrical portion 23. The application of a D.C. voltage from a source (not sown) to this field winding creates a unidirectional magnetic flux, the direction of which is determined by the polarity of the voltage on the field winding; and this flux flows along the path indicated by the heavy flux lines 33 and 34. It is assumed that the polarity on the field winding is such as to cause the flux to flow in the direction of the arrows shown on the flux line. Thus, flux will flow in the direction from right to left in FIG. 1 through cylindrical portion 23, to the central portion 15a on the rotor disc; and in doing this it will cross the narrow axial air gap between portions 23a and 15a and the narrow radial air gap between cylindrical portions 23 and 18, as shown. The flux will travel radially outward from the central portion 15a to the outer enlarged portion or pole 15b on the rotor disc; and since pole 15b of the rotor is juxtaposed to and faces the face 29 of the stator armature core, it will cross from pole 15b through the axial air gap to enter the armature core from a position 33b. It is assumed to enter the armature core at a position 33c (FIG. 2) as represented by the cross, from whence it flows toward the center of the armature core to a position past the slots. It then turns and flows circumferentially through the armature core in both directions as shown by lines 33d in FIG. 2. This circumferential flow represented by the two lines 33d carries to a position 33e of the core which is diametrically opposite the position 33c and is represented by a dot which indicates that the flux emerges from the armature core at this position 33e and passes to the left (FIG. 1) across the axial air gap to the enlarged portion or pole 14b of the rotor disc where it turns radially outward, as represented by lines 33f to a position opposite and juxtaposed to the cylindrical section 21 where it turns to the right (FIG. 1) to cross the axial air gap into section 21 to pass through portions 21 and 22 along line 33g, back to the cylindrical portion 23 to complete the magnetic circuit.

When the machine is operated as a generator or alternator by driving shaft 10 while D.C. current is sent through the field winding, the rotation of the disc will cause rotation of disc poles 14b and 15b past the armature core slots which will cause the flux represented by lines 33c and 33e and crossing the axial air gap to cut through the armature windings, thereby generating voltage in the armature windings in a well-known manner; and this voltage is utilized by carrying the terminals of the armature winding to a position outside the housing by leads (not shown); and such leads from the armature constitute the output terminals of the alternator. Such a machine will be a synchronous machine because its output frequency will be established by the speed of rotation of the rotor.

The machine can, of course, be operated as a motor in a well-known manner. It may, for example, be brought up to speed by impressing alternating voltage on its armature, while little or no D.C. current is sent through the field winding. The induced eddy currents in the rotor will cause the rotor to turn and speed up; and when the rotor approaches synchronous speed the D.C. current may then be sent through the field winding to pull it into synchronous speed. It will be understood, of course, that any other means may be used to bring the rotor up to synchronous speed, such as for example a starting winding or the like.

Figure 3A:
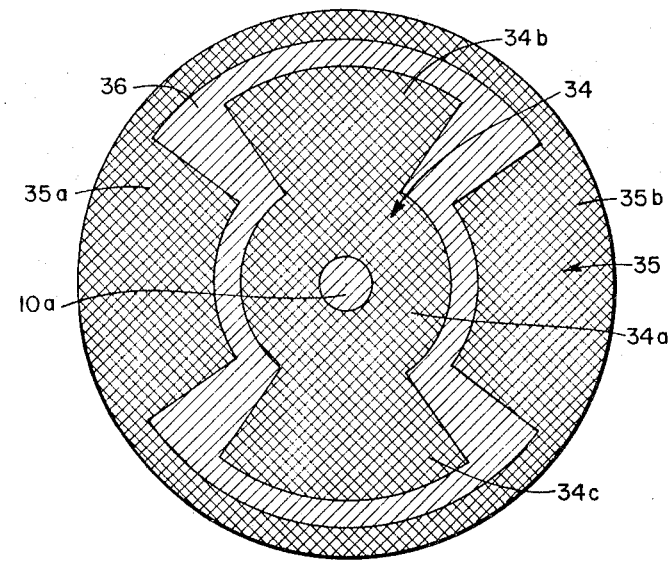
FIG. 3a is a cross-section view of another form of rotor disc which can be used alternatively to that of FIG. 3.

FIG. 3a is a cross section also taken at line 3—3 in FIG. 1, of a somewhat different form of rotor disc than that of FIG. 3. The essential difference between FIGS. 3 and 3a is that FIG. 3 shows a two-pole rotor disc, having the two poles 14b and 15b while FIG. 3a shows a four-pole disc. FIG. 3a, like FIG. 3, has parts 34 and 35 of magnetic material separated by a non-magnetic circuitous material section 36. The portion 34 has its region 34a immediately around the shaft and instead of having only one enlarged portion extending radially away from the shaft, it has two enlarged pole portions 34b and 34c oppositely disposed relatively to each other; and the portion 35 likewise has two enlarged poles 35a and 35b oppositely disposed relatively to each other and having their centers displaced 90 degrees from the center line through sections 34b and 34c. Except for the difference in the number of poles and the corresponding change it makes in the disc structure, there is no other essential difference from the rotor shown in FIG. 3. For a given speed of rotation, the frequency at the armature output in the case of FIG. 3a, will be double that in the case of FIG. 3, where the machine is driven as a generator.

Although the end view or the machine of FIG. 1 is not shown, it will be understood that the outer housing walls such as surfaces 12b and 21 are circular, in conformity with the circular rotor disc. All the embodiments of the invention herein utilize circular rotor discs and toroidal stator armature cores with armature windings; hence the housing outlines as seen from the end are all circular. (Throughout the drawings, like numerals are used to designate like parts.)

Figure 4:
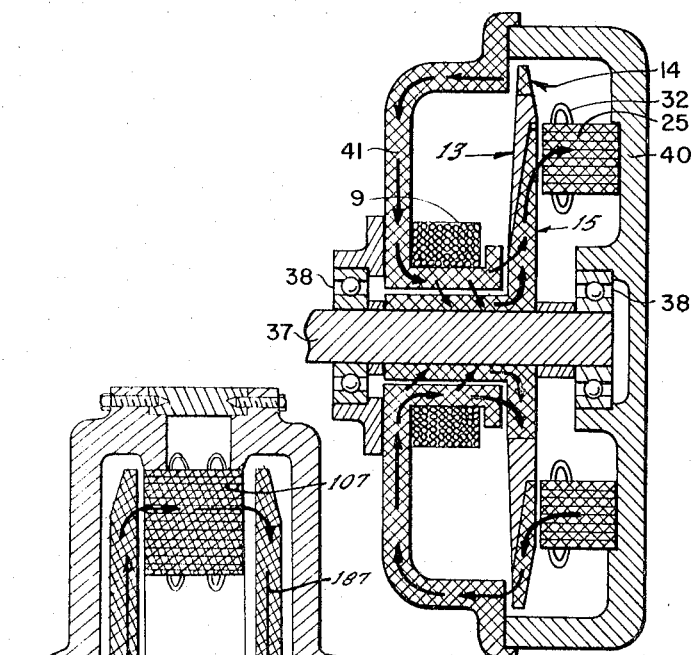
FIG. 4 is a cross-section view of another form of synchronous-type machine according to the present invention.

FIG. 4 shows a machine which is modified somewhat from that of FIG. 1. In FIG. 4, the shaft 37, shown rotatable in its bearings 38, corresponds with shaft 10 of FIG. 1 and the rotor disc 13 fixed to the shaft, is similar to the disc 13 of FIG. 1.

The non-magnetic housing member 40 of FIG. 4 corresponds in general to the member 12 of FIG. 1 and the member 41 of magnetic material corresponds in general with the magnetic member 20 of FIG. 1. In FIG. 4 the rotor disc 13 is located between the stator armature core 25 and the field core 9 which can be the same as the same numbered stator core and field coil respectively of FIG. 1.

The magnetic circuit in FIG. 4 is analogous to that in FIG. 1, allowing for the fact that the magnetic path goes to both sides of the rotor disc instead of to only one side as in FIG. 1. Thus, in FIG. 4 the magnetic path will pass from rotor pole member 15 into the armature core and then back to rotor pole 14, just as in FIG. 1; and then it will be completed through the cylindrical sleeve on which the field coil is mounted and member 41 at the opposite face of the rotor disc from that which faces the armature core.

Figure 5:
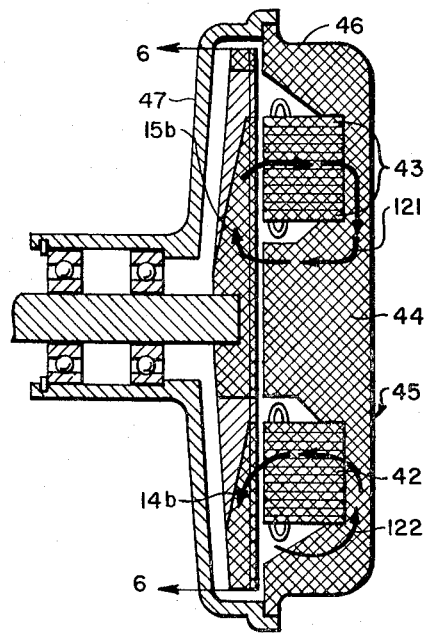
FIG. 5 is a cross-section view of another form of synchronous-type machine according to the invention.
Figure 6:
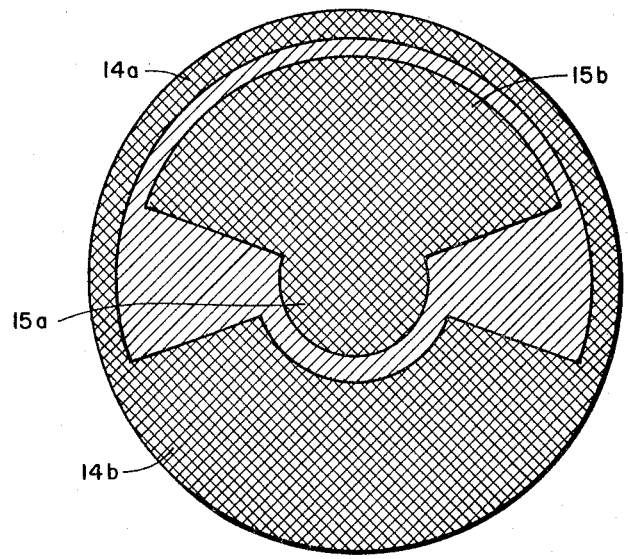
FIG. 6 is a cross-section view of a rotor disc used in the machine of FIG. 5 taken at line 6—6 of FIG. 5.

FIG. 5 is an embodiment which is somewhat similar to FIG. 1 in that both bearings are located to the left of the rotor disc which has a cross section taken at line 6—6 like that of FIG. 6. Thus, this disc is similar to that of FIGS. 1 and 3, except that the shaft protrudes into only part of the disc and not all the way through it. Like the disc shown in FIG. 3 it has the oppositely disposed poles 14b and 15b; there being the circumferential portion 14a and the central portion 15a at the axis. A difference from FIG. 1 is that in FIG. 5 there is no field coil such as coil 9 separate from the armature. Instead, the field coil is built into the armature core 42 in the form of a helically wound ribbon or strip 43 of electrically conducting magnetic material which is suitably coated with an electrically insulating layer as by lacquer or the like, so that adjacent convolutions of the helix do not make electrical contact with each other. Thus, the two ends of the ribbon constitute the electrical terminals of the field coil and since the ribbon 43 is of magnetic material, this helical winding of the ribbon acts as a magnetic stator core which will be slotted as shown in FIG. 2a to receive the armature winding.

This toroidal stator armature core is fitted around the centrally located boss 44 of a structure 45 of magnetic material, the outer periphery 46 of which is joined to the stationary housing member 47 of non-magnetic material which supports the bearings for the overhung shaft. Narrow axial air gaps for clearance are provided between the right-hand face of the rotor disc and the boss 44, and between the armature core 42 and the adjacent face of the disc and between the face of the peripheral portion 46 and the adjacent face of the disc.

The flux paths of the machine of FIG. 5 are different from those of the machines of FIGS. 1 and 4. In FIG. 5, the flux can be considered to be divided into two primary magnetic coils represented by the flux lines 121 and 122. The major part of the flux, which issues from the rotor pole 15b enters the stator armature core, passes through the core in an axial direction and into the structure 45, turns and passes more or less radially into the boss 44, turns and flows more or less axially through the boss 44 and across the axial air gap into the central portion 15a of the rotor, turns and passes more or less radially into the rotor pole 15b, completing one of the primary magnetic circuits. In the other primary magnetic circuit, the flux which issues from the outer portion of rotor pole 14b passes through the axial gap and enters the peripheral portion 46 of the structure 45, turns and passes more or less radially inward through the structure 45, turns and flows in a more or less axial direction into and through the stator core 42 and across the axial gap and into the inner portion of the rotor pole 14b, and then turns and flows more or less radially to the outer portion of the rotor pole 14b, completing the secondary primary magnetic circuit. This configuration eliminates the need for appreciable back iron in the stator core, as it is not essential for the flux to flow in a peripheral direction in the stator core 42. The expression "back iron" as used in this specification means the iron or magnetic material of the stator core to the rear of the stator slots in which the armature windings are placed.

Figure 7:
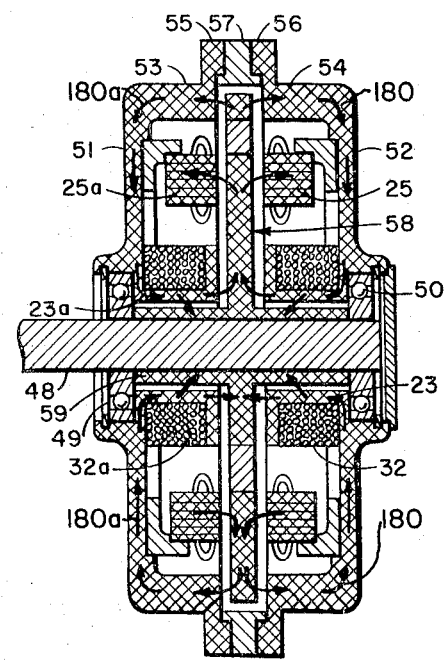
FIG. 7 is a cross-section view showing another form of synchronous-type machine according to this invention using a multiple stator core arrangement and multiple field windings.

FIG. 7 shows a machine which somewhat resembles that of FIG. 1, but which differs from FIG. 1 in being a multiple machine in that it has two field coils and two stator armatures which are related to a single rotor disc. In FIG. 7, the shaft 48 is rotatable in the bearings 49 and 50 mounted in two respective members 51 and 52 which are dish-like members of magnetic material whose cylindrical outer circumferential portions 53 and 54 are brought close to each other at flanges 55 and 56 which are separated by a separator circular ring 57 of non-magnetic material, the members 55, 56 and 57 being fastened together. The rotor disc 58 is located centrally within the enclosure formed by members 51 and 52 are fastened to the shaft by means of sleeve 59 which is an integral part of the rotor disc. The rotor disc is essentially like that of FIG. 1, the principal difference being that the disc in FIG. 7 is the same on both of its faces since in FIG. 7 each face of the disc is perpendicular to its axis of rotation and faces a toroidal armature core 25 and 25a respectively, mounted on their respective brackets at opposite sides of the disc. Whereas in FIG. 1, the magnetic material portions of the disc taper at their sides away from the armature windings, in FIG. 7 on the other hand there is no such tapering since magnetic material portions of the disc are carried to both disc faces. In FIG. 7 there are two field windings 32 and 32a, respectively, at the respective opposite sides of the disc, these being wound around the cylindrical sleeves 23 and 23a attached to the respective members 52 and 51.

In the arrangement of FIG. 7 there will be two separate magnetic circuits having the magnetic material of the disc as a common leg. Thus, there will be one magnetic circuit 180 due to field winding 32 which will pass from sleeve 23 through a pole of the disc, across the axial air gap to armature core 25 and back across the axial air gap through the other pole of the disc and then to the material of members 54 and 52, to complete the circuit to members 23, and there will be a second similar magnetic circuit 180a due to field winding 32a, which will pass through the disc to armature core 25a and back to the disc and then to the material of member 51 to complete the magnetic circuit. Each of these individual magnetic circuits will be similar to the magnetic circuit of FIG. 1.

Figure 8:
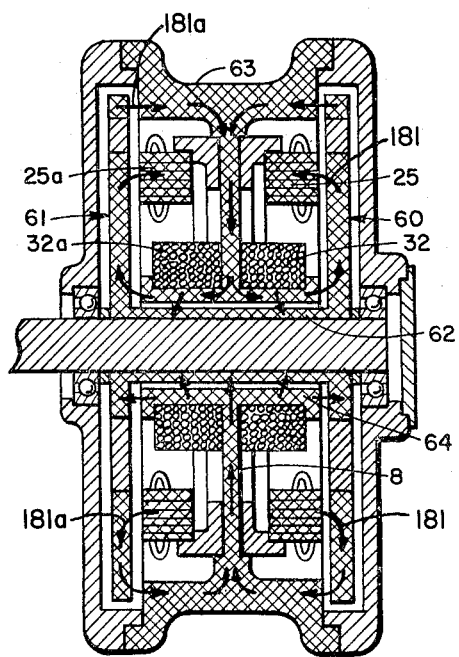
FIG. 8 is a cross-section view of another form of synchronous-type machine according to this invention utilizing multiple stator cores and multiple field windings and multiple rotors.

FIG. 8 shows another form of multiple machine, which has two rotor discs 60 and 61 joined to each other by a sleeve 62 of magnetic material and fastened to the shaft. This machine has two toroidal stator cores 25 and 25a having their slots with the stator windings juxtaposed to the adjacent faces of the respective discs 60 and 61. These stator cores are mounted on brackets fastened to a central circular webbing 8 of magnetic material which is integral with an outer cylindrical flange 63, which extends to the outer peripheral portions of the respective discs, leaving an air gap therebetween; and the member 8 has an inner cylindrical portion 64 concentrically around the sleeve 62 and leaving an air gap therebetween. Field windings 32 and 32a are wound around this member 64 on the respective opposite sides of the web 8.

The magnetic circuits for the machine of FIG. 8 will be somewhat similar to those of FIG. 7, bearing in mind that the common leg for the two magnetic circuits will now be the stationary web member 8 instead of the rotor disc as in FIG. 7. Thus, the magnetic path 181 due to field winding 32 can be traced from member 64 across the air gaps to members 62 and the adjacent pole of the right-hand rotor disc, thence into the stator armature core 25 and angularly around the core and back across the axial air gap to the next pole of the disc, then across the air gap into member 63 and through the central web 8 to member 64 to complete the circuit. A similar magnetic circuit 181a due to field winding 32a can be traced through the central web 8 and through the magnetic material portions of rotor 61 and through the stator core 25a. The two field coils 32 and 32a may be connected so that the flux generated by each of them is equal and additive through sleeve 64, in which case the web 8 carries no flux; and it could therefore be of non-magnetic material. But if coils 32 and 32a are connected to oppose each other, there will be flux in web 8. When flux is required to pass through web 8 it should be made of magnetic material.

The operation of all the above-described machines will be apparent from what has been explained of the operation of the machine of FIG. 1. In the case of the multiple machines of FIGS. 7 and 8, the armatures of the two stator cores can be operated independently of each other or they may be connected with each other in some suitable way as may be desired, for example, in multiple or in series.

The machines which have been illustrated in FIGS. 1 to 8 inclusive and described herein above are of the type referred to herein as "synchronous," that is, in these machines every rotor disc is provided with one or more north poles and one or more south poles in the disc face juxtaposed to a stator armature core face so that flux flows from a north pole of the rotor disc face through the axial air gap into the armature core in one region of the stator armature core face and flows from said armature core in another region of said stator armature face through the axial air gap into a south pole of said rotor disc face, thereby causing reversal of flux in any given region of the stator armature face when the flux pattern rotates with the rotor disc. This is also true of the machines shown in FIGS. 15 to 19 inclusive. FIGS. 9 to 14 inclusive show machines which are of the type referred to herein as "inductor," that is, in these machines every rotor disc is provided with one or more north poles or one or more south poles but not both north and south poles; so that for example if all poles in one disc face are north poles the flux flows from the pole or poles of the disc through the axial air gap into the juxtaposed stator armature core in the region or regions of the stator armature core face adjacent to the pole or poles of the rotor disc, and flows out of the stator armature core into the stationary magnetic material used to complete the magnetic path back to the disc; or, where two rotor discs are used with one stator armature core, out of the first armature core through the second face of the stator armature core through the second axial air gap into the poles of the second rotor disc and back through the magnetic material which completes the flux path to the first rotor, thereby causing the flux intensity in any given region of the stator armature face to vary or pulsate, but not to reverse direction as the flux pattern rotates with the rotor disc. It will be understood that these "inductor" type machines are encompassed within the broad classifications of synchronous dynamoelectric machinery and the term "inductor" is used herein to distinguish one group of machines from another as described above.

Figure 9:
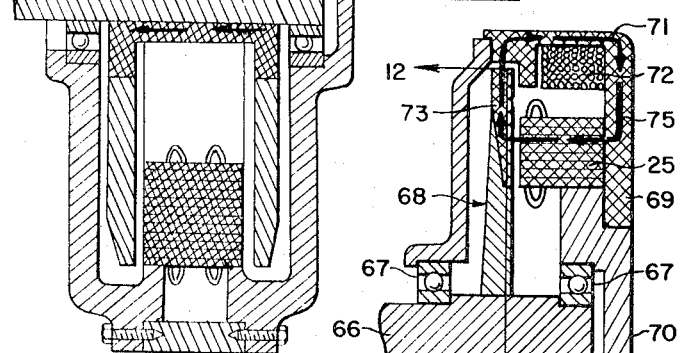
FIG. 9 shows an inductor-type of machine according to this invention.

FIG. 9 is a simple example of this last-mentioned inductor-type of machine. Like the previously discussed machines, it comprises a shaft 66 rotatable in bearings 67 to which is fastened a rotor disc 68. The stator armature core 25, with its armature winding is juxtaposed to the rotor disc, with the narrow axial air gap therebetween, and the opposite side of the stator core from the rotor is abutted against end member 69 which is fastened to a housing member 70 of non-magnetic material which supports the right-hand bearing 67. The magnetic circuit is completed through outer cylindrical portions 71 integral with member 69, the end of member 71 closely surrounding the periphery of the rotor disc leaving only a small air gap therebetween. A toroidal field winding 72 for application of D.C. field current fastened inside the cylindrical portion 71.

The face view of the rotor disc is indicated by FIG. 10 which is a cross section taken at line 12—12 of FIG. 9 close to its face. At its face adjacent the stator core, the rotor disc comprises a pole portion 73 in the form of a semi-circular band located adjacent the periphery and wide enough to extend to the inside radius of core 25. The remaining semi-circle of the disc contains a much narrower semi-circular band 74 also at the periphery of the disc, which joins the two ends of the band 73. As shown in FIG. 9, this narrow band 74 is not wide enough to reach even the greatest radius of the core 25.

In the operation of the machine of FIG. 9, when the shaft is rotated while the D.C. current is turned on the field winding, the magnetic path takes the form of the flux line 75; and it flows through the stator core, but only that part of it which is juxtaposed to the pole portion 73 at the moment. Thus, as the rotor disc rotates, the flux pattern which passes through approximately 180 degrees of the stator core, rotates similarly. Thus, in the view of FIG. 9, while the upper part of the stator core is carrying flux, the lower part carries no flux because it is not juxtaposed to any part of the magnetic material of the pole 73 of the rotor disc.

It is noted also that the flux path 75 differs substantially from that of the machines of FIGS. 1 to 8 as illustrated in FIG. 1. Whereas the flux path is shown in FIG. 1 as entering the stator core axially from a rotor pole, and then reversing itself and leaving the stator core axially through another rotor pole, in FIG. 9 on the other hand, the flux path 75 does not reverse in the stator core to return to the rotor, but instead goes straight through the stator core in the axial direction, and on across the air gap to the rotor pole 73, then across another air gap to the element 71 and through element 69 to the right-hand face of stator core 25 to complete the magnetic circuit. It is noted further that the rotor disc of FIG. 10 differs from the rotor used in FIGS. 1 to 8 in that in FIG. 10 there is only one pole, rather than two poles or pairs of poles separated from each other by a non-magnetic material. In FIG. 10, the non-magnetic portion 76 does not separate any poles from each other but merely serves to define the pole.

FIG. 10 is a cross-section view of a modified form of rotor disc which may be used in the machine of FIG. 9 instead of the particular disc 68. The disc of FIG. 10a is like disc 68 except that the pole 73 of FIG. 10 is divided into two opposite pole portions 73a and 73b in FIG. 10a. Both portions 73a and 73b will be juxtaposed to the stator core and will have the same polarity, and they are joined by the thin peripheral sections 74a and 74b which are not juxtaposed to the stator core. Except for the difference in the number of poles the disc of FIG. 10a will operate the same as that of FIG. 10, except that for a given speed of rotation the disc of FIG. 10a will create double the frequency at the stator armature windings that the disc of FIG. 10 will create, when the machine is operated as a generator.

Figure 11:
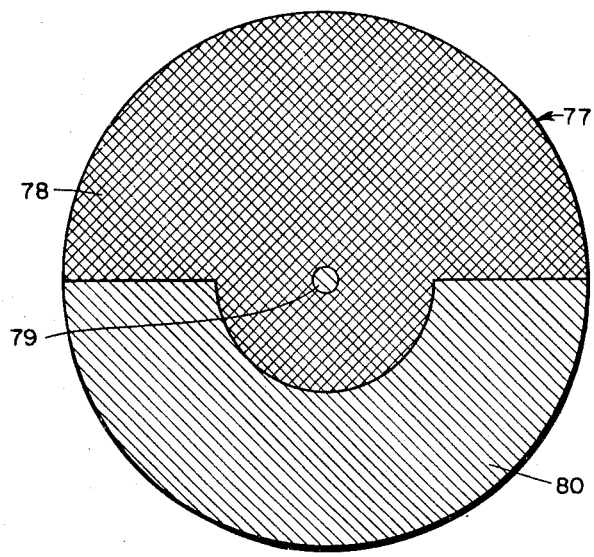
FIG. 11 shows a cross-section view of another form of rotor disc.
Figure 11A:
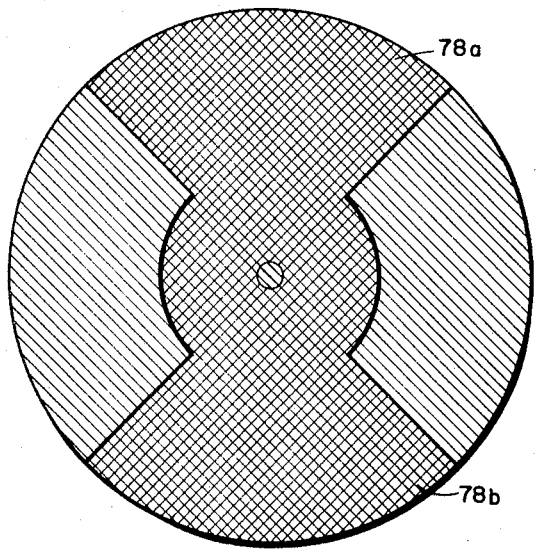
FIG. 11a is a cross-section view showing another form of rotor disc which can be used in place of the disc shown in FIG. 11.

FIG. 11a shows a modified form of rotor disc which may be used in place of that shown in FIG. 11. In FIG. 11a, there are two pole pieces 78a and 78b, instead of the single pole member shown in FIG. 11. Thus, the frequency when using the rotor of FIG. 11a will be double the frequency had at the stator winding when using the rotor of FIG. 11.

Figure 12:
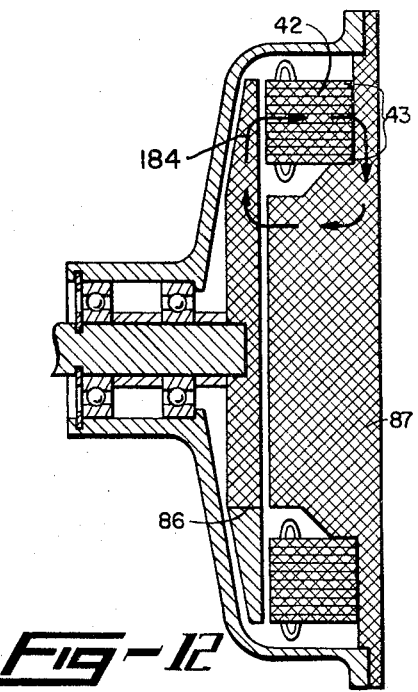
FIG. 12 shows another inductor-type machine according to this invention.

FIG. 12 shows another modification of an inductor type machine. A stator core 42 is used, like that of FIG. 5, to act as both the field winding and as the magnetic material for the stator core. Like the core 42 of FIG. 5, it can be composed of a helical winding of ribbon 43 of magnetic material suitably lacquered or insulated on its surface to provide electrical insulation between adjacent convolutions. The rotor in FIG. 12 may be similar to the rotor 77 of FIG. 11, and its central portion should be made of sufficient radius to reach a position 86 of as much radius as the member 87 of magnetic material juxtaposed to it. As had been explained in connection with FIG. 9, the magnetic path 184 will pass through the stator core and across the axial air gap to the rotor pole and then back from the rotor pole through the axial air gap to the stationary member 87 and back to the stator core, to complete the path.

Figure 13:
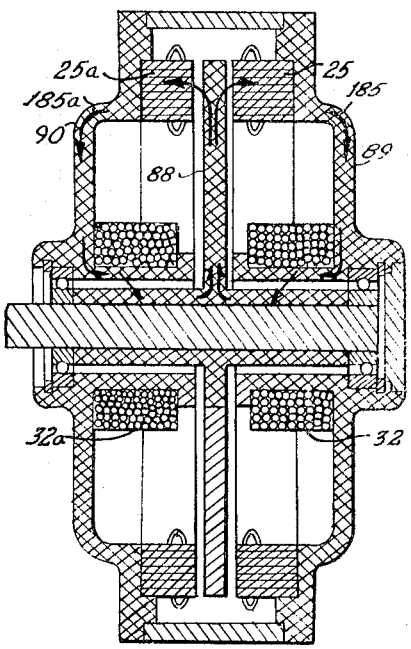
FIG. 13 shows a form of inductor-type machine according to this invention utilizing multiple stator cores and multiple field coils.

FIG. 13 shows an inductor type machine with multiple elements, having two field coils 32 and 32a located on stationary sleeves of magnetic material and on opposite sides of a rotor disc 88 which is quite similar to rotor 77 of FIG. 11, except that both faces of the disc are perpendicular to the shaft to which the rotor disc is fixed. The machine also has two stator armature cores 25 and 25a with their stator windings at opposite sides of the rotor disc.

There will be a magnetic path 185 through the magnetic material of the rotor disc across the axial air gap into stator core 25 and through housing member 89 of magnetic material to the sleeve of the field coil 32 and back across the air gap to the magnetic material of the rotor. The magnetic path 185a for the other stator will be from the magnetic material of the rotor disc, across the axial air gap to the stator core 25a and through housing member 90 of magnetic material to the sleeve of field coil 32a and back across the air gap to the magnetic material of the rotor.

Figure 14:
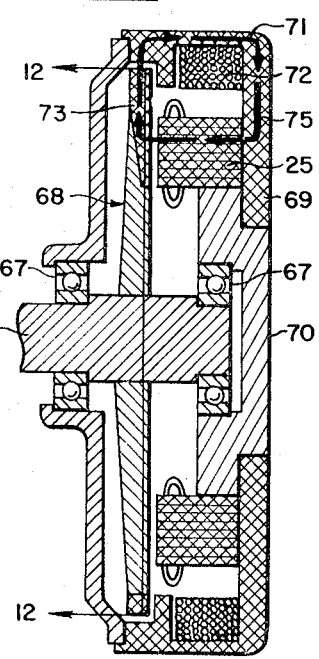
FIG. 14 is a cross-section view of another form of inductor-type machine according to this invention utilizing multiple rotor discs and a single stator structure with multiple armature windings.

FIG. 14 shows a machine comprising two spaced rotor discs within a housing of non-magnetic material with a single toroidal stator core 107 located at the outer peripheries of the discs. It also comprises stator winding slots at both of its side faces. The core, however, instead of merely constituting magnetic material for the magnetic circuit, also constitutes the field winding by reason of its being constructed as described in connection with the stator core of FIGS. 5 and 12. Each of the discs fastened to the rotor shaft may be constructed as shown in FIG. 11 and the central portions of magnetic material of the disc are joined by a sleeve 108 of magnetic material fitted around the shaft. Thus, the magnetic circuit, shown by line 187, passes through the magnetic material of one rotor disc, through the axial air gap to the stator core 107 and out the other axial air gap to the magnetic material of the other rotor disc and then back to the sleeve 108, which completes the magnetic circuit.

Figure 15:
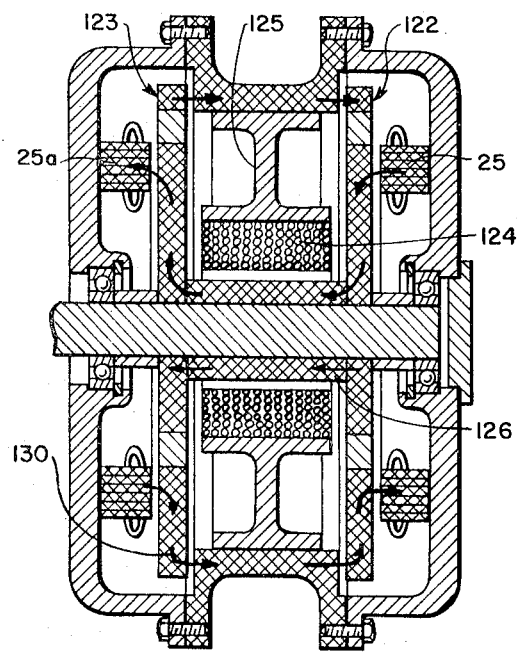
FIG. 15 is a cross-section view of an embodiment of a synchronous-type machine according to this invention utilizing a double disc rotor with a stator armature for each and a single field winding supported between the rotor discs.

FIG. 15 shows an embodiment of a synchronous type machine utilizing two rotor discs 122 and 123, fixed to the rotatable shaft and with a single stationary field winding 124 located therebetween and supported by a suitable mounting or web 125 at a position leaving a narrow radial air gap between the coil and a sleeve 126 of magnetic material fixed to the shaft. At the sides of the rotor discs opposite the field coil there are provided respective toroidal stators 25 and 25a, respectively. The rotor discs may be of the type shown in FIGS. 7 and 8. There is a single magnetic circuit in this machine shown by the flux line 130.

Figure 16:
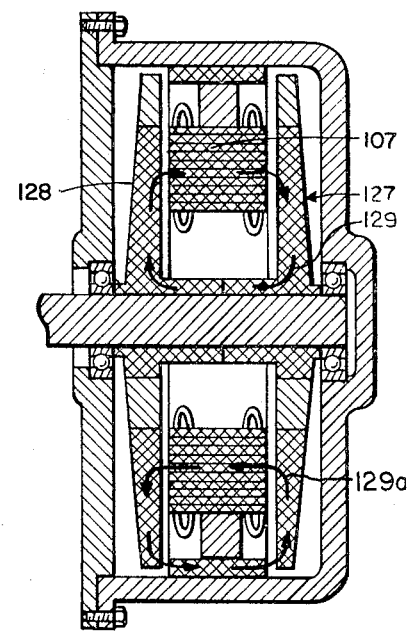
FIG. 16 is a cross-section view of another embodiment of a synchronous-type machine according to this invention utilizing two rotor discs with an armature winding for each mounted on a single core which provides the field winding.

FIG. 16 shows still another modification utilizing a pair of spaced rotor discs 127 and 128 both fixed to the shaft with a toroidal stator 107 therebetween which is constructed like the same numbered stator in FIG. 14 in that it has stator windings in slots at its opposite faces and in that it also constitutes its own field winding by reason of its being constructed as described in connection with the stator core of FIGS. 5 and 12. The rotor discs 127 and 128 may each be constructed according to the disc of FIG. 3 except that the portion 14a of the pole 14 is omitted, leaving in its place the nonmagnetic material 16. The magnetic circuit is as shown by the flux line 129 and 129a, from which it is seen that there are two flux circuits, one through the outer pole and the other through the inner pole of the rotor disc.

FIG. 17 shows another embodiment of a synchronous type machine which is of the same general type as that shown in FIG. 4 in that there is a toroidal stationary armature 133 on one side of a rotor disc 134 affixed to rotor shaft 135; and on the other side of the rotor disc there is a toroidal field winding 136 mounted within the recess of stationary housing member 137 of magnetic material. The rotor of FIG. 17, a cross-section view of which is shown in FIG. 18, is somewhat different from the rotor shown in FIG. 4. The rotor 134 of FIGS. 17 and 18 is similar to that of FIG. 4 in that it has a face 138 which is perpendicular to the axis of rotation and is juxtaposed to face 139 of the stator armature core which is also perpendicular to the axis of rotation with an axial air gap between the faces. But the difference from the rotor shown in FIG. 4 resides in the fact that outer pole 140 is beveled off at 141 thereby carrying it away from the armature winding and it is carried over at 142 close to the portion 137a of magnetic member 137, with a narrow gap therebetween. The portion 142 of magnetic material is carried around the full periphery of the disc. It will be seen that the region 143, 143a, 143b is air space. The flux path is indicated by flux line 144 and is substantially similar to the flux path in FIG. 4. As shown by the flux line, the flux generated by the field winding 136 passes through the hub portion of housing member 137 in a general axial direction across the axial air gap and into the inner pole 145, and then across the opposite axial air gap into the armature core 133, then peripherally through the armature core and then back across the axial air gap into the outer pole 140 of the rotor disc and then in a general axial direction across the air gap into the portion 137a of housing member 137, and back through the hub of member 137 to complete the magnetic path.

Figure 18A:
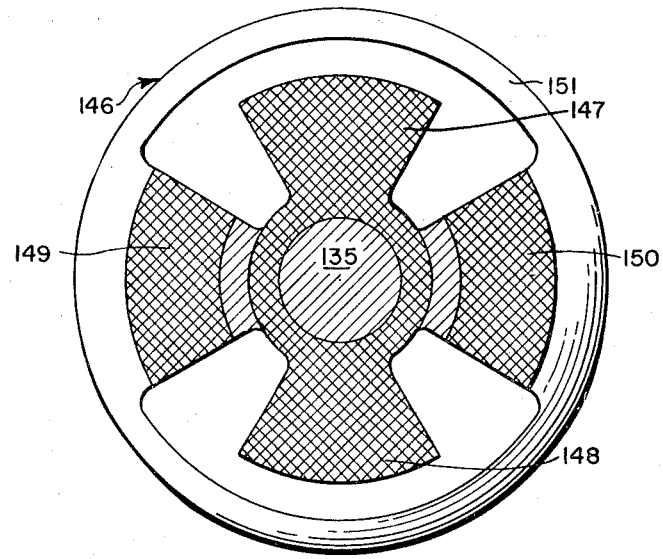
FIG. 18a is a cross-section view of another form of rotor disc which may be used in lieu of that shown in FIG. 18.

FIG. 18a is a cross section view looking at the face of a rotor disc which may be used in lieu of the rotor disc 134 of FIGS. 17 and 18. Whereas there are two poles 140 and 145 in disc 134, there are four poles in disc 146 of FIG. 18a. There are two inner poles 147 and 148 integral with each other and there are two outer poles 149 and 150 which are also integral with each other by reason of the peripheral portion 151, which is also of magnetic material. Poles 147 and 148 will both be of the same polarity, for example north poles, while poles 149 and 150 will also be of the same polarity but of opposite polarity to poles 147 and 148, for example south poles.

Figure 18B:
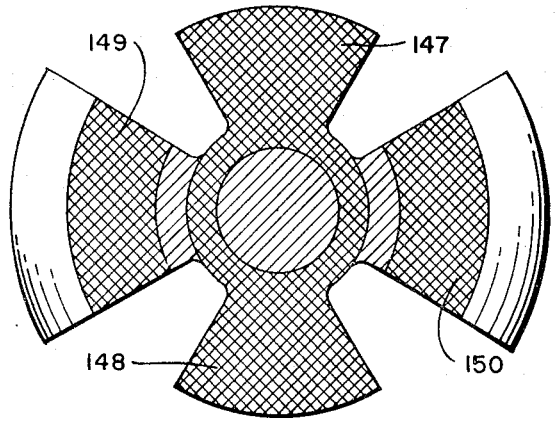
FIG. 18b is a cross-section view of another form of rotor disc which may be used in lieu of that shown in FIG. 18.

FIG. 18b shows a cross-section view looking at the face of another form of rotor disc which may be used in lieu of the disc 134 of FIGS. 17 and 18. In FIG. 18b there are the two inner poles 147 and 148 and the two outer poles 149 and 150; but the peripheral portion 151 of FIG. 18a is omitted in the structure of FIG. 18b. This results in a disc having finger-like poles. It could likewise be said that the discs of FIG. 18a have finger-like poles since the poles are similar to the fingers of FIG. 18b.

Another difference of the machine of FIG. 17 from that of FIG. 4 resides in the arrangement of the rotor shaft 135. This is an overhung shaft in that the rotor disc is mounted and fixed to the overhung portion of the shaft. At this overhung portion there is provided a shaft extension 152 provided with internal splines 153 extending in the axial direction to the shaft. At the opposite end of the shaft, the shaft is splined at 154 at its exterior surface. By this arrangement it is possible to assemble a plurality of machines or units of the type shown in FIG. 17. Thus the splines 154 of one unit can be inserted within the extention 152 to engage the splines 153 of another unit, in which case the annular housing portion 155 of the first-mentioned unit will abut the similar annular end portion 156 of the housing of the next unit. In this manner a number of units can be joined in tandem so that their shafts rotate in unison. The outputs of the respective armatures of the units may thus be used individually or may be joined together in series or in parallel or in any other connection as may be desired.

FIG. 19 shows a modification of the arrangement of FIG. 17. The difference from the arrangement of FIG. 17 resides in the fact that in the structure of FIG. 19 the rotor disc is constructed as a double disc which constitutes in effect two discs at 157 and 157a which are joined together as a unitary structure at their hub portions around the shaft 158. Each of the individual discs 157 and 157a can be constructed as shown in FIGS. 17 and 18 or, alternatively, as shown in the structure of FIG. 18a or FIG. 18b. The machine of FIG. 19 is provided with two toroidal armatures 133 and 133a which are constructed similar to each other and are juxtaposed to the respective rotor discs 157 and 157a. The field winding 159 in FIG. 19 has a toroidal winding supported by a member 160 of magnetic material around the hub portion of the rotor disc with a clearance air gap therebetween.

The magnetic path is as shown by flux line 161. The flux generated by the field winding passes through the hub portion of the rotor in an axial direction, as shown, and then across the axial air gap from the inner pole of the rotor 157 to the stator 133, then peripherally around the toroidal stator pole to a position opposite the outer pole of disc 157 and then to its outer periphery, and then across the gap to member 160, through the member 160 in the axial direction to the outer periphery of rotor disc 157a, then to the outer pole of disc 157a and across the axial air gap to the toroidal armature core 133a, then peripherally through core 133a to a position opposite the inner pole of disc 157, then across the axial air gap to this last-mentioned inner pole and back to the hub portion of the rotor disc to complete the magnetic circuit.

It will be noted that the machine of FIG. 19 is in the same general category as that of FIG. 15, the difference between FIGS. 19 and 15 residing in the structural arrangements described. As in the case of the machine or unit of FIG. 17, the machine or unit of FIG. 19 can be joined with an additional unit or units by virtue of the splines 154 on its shaft. It will be recognized that this splined shaft end can be inserted into the shaft extension of another unit such as, for example, the shaft extension 152 of the unit shown in FIG. 17. Alternatively, it is apparent that a unit similar to that of FIG. 19 can likewise be provided with a shaft extension having internal splines adapted to receive splines 154.

From what has been hereinabove discussed it will be recognized that the machines of FIGS. 15 to 19 are of the type herein defined as the synchronous type.

In many embodiments of the invention, the rotor discs are shown as circular discs containing poles of magnetic material and also non-magnetic material in areas of the disc not occupied by the poles. It should be recognized that the non-magnetic material may be partially or completely eliminated, consistent with support and adequate strength for the pole members of the disc. For example, in FIG. 11a, the non-magnetic material may be eliminated, leaving the disc in the form shown by the magnetic material. In such case, the magnetic material remaining to constitute the disc would not be a circular disc. Instead, the disc would be composed of the portion around the shaft and a pair of fingers which would be the pole portions 78a and 78b. The same comment applies to the disc of FIG. 11, which if the non-magnetic material 80 were removed, would then only have a single large finger 78 extending from the hub portion.

The expression "disc" as used in this specification and claims means an element which can be mounted for rotation and presents a face substantially normal to the axis of rotation so as to form an axial air gap with a stator armature element. The expression "disc" covers an element which is circular in its face view and also covers an element having discrete poles or fingers in the face view, such as the finger types of FIGS. 18 18a and 18b.

It will be understood that a disc according to the present application may have attachements such as projections having surfaces which are non-perpendicular to the axis of rotation for the flux path return from the rotor to a static member for completion of the magnetic circuit.

The expression "axial air gap" as used in this specification and claims means the small space or gap between a face of the rotor disc which is substantially normal to the axis of rotation and a face or surface of the stator armature core which is juxtaposed and substantially parallel to the said disc face.

From the foregoing illustrations and descriptions it is seen that there are many forms possible for synchronous and inductor type machines within the scope of this invention. There are various possible positions of the armature cores and the field windings in relation to each other and to the the rotor discs. Furthermore, many forms of rotor discs are possible, only a few of which have been shown herein. It will be understood that the several forms of disc may usually be interchanged with each other, consistent with their being proportioned to suit the locations of the armature cores. Furthermore it is apparent that multiple discs and multiple stator armature cores and windings and multiple field windings may be used. While as many as two rotor discs and two stator armature cores have been shown in some embodiments, it will be understood that more than two of these may be used in a machine.

The magnetic material of the rotor can be made of such magnetic material as pure iron, REMA iron, Supermendur (an alloy of vanadium, iron and cobalt), 2V-Permendur (an alloy of 2% vanadium, 49% iron and 49% cobalt, by weight), and the like all of which are easily cast and machinable. The non-magnetic material of the rotor including the circuitous bands separating the poles of magnetic material can be of non-magnetic stainless steel, aluminum, brass, or Cupaloy, or the like, or plastic or other non-metals. (Cupaloy is a trademark for a nearly pure copper alloyed with small amounts of silver and chromium.) Such a copper alloy can be cast in most conventional shapes with a casting technique which causes it to bond with the magnetic materials of the rotor.

When using a finger-type rotor, it is apparent that inserts of non-magnetic material need not be incorporated. Such a finger-type rotor, for example, consists of a hub portion around the shaft with a number of poles, such as four poles angularly spaced equidistant apart. All the poles will have the same polarity.

A portion of the housing may be made of magnetic material to constitute part of the flux return path. This may form the basic static structure, thereby reducing weight and cost.

While the several drawings illustrate stator parts of non-magnetic material, and also rotor parts such as the shaft, of non-magnetic material, it will be understood that the use of magnetic material in all such parts is not necessarily precluded. It will be understood, of course, that where non-magnetic material is shown in the rotor disc to separate magnetic poles, such non-magnetic material should not be changed to magnetic material, and moreover, may be eliminated if not required for structural purposes. The illustration of the non-magnetic material simply indicates that it is not required that the material be magnetic material since the essential magnetic circuit of the machine is indicated by the cross sections indicating the magnetic material. It will be understood, of course, that the shaft may be made of magnetic material and thereby form part of the field flux path, thereby tending to reduce the amount of weight and material which might otherwise be required for adequately building the magnetic path.

Where axial air gaps have been indicated, they should be just sufficient for adequate clearance, but should not be so large as to introduce undue reluctance into the circuit. The axial air gaps can conveniently be about 10 to 500 mils, depending upon alternator rating, physical size, cost, type of drive, temperature environment and vibration and shock requirements. Where radial air gaps are indicated, they may conveniently be about 5 to 100 mils.

The term "radial air gap" as used herein means the narrow clearance space or gap between a convex cylindrical surface and a concave cylindrical surface of somewhat larger diameter which surrounds the convex surface.

It should be understood that in some of the embodiments there is more than one possible flux path. For example, in FIGS. 8 and 13, one of two possible flux paths has been shown. By reversing the voltage applied to one of the two field coils, a different flux path arrangement is obtainable as will readily be understood by those skilled in the art.

It will be understood that when it is desired to start up one of the machines as a motor, this may be done by building a suitable starter winding on the rotor in a well-known manner.

Some of the advantages of these novel machines are as follows:

Due to the finger or disc-type rotor design, a high permissible rotative speed is obtainable with any given size machine.

The design provides for a very good voltage regulation over a wide speed range when used as a generator.

The finger or disc-type rotor configuration is relatively easy to manufacture by casting, forging, stamping, machining and otherwise.

The finger or disc-type rotor configuration has inherently high strength.

The armature configuration for use with the disc-type rotor makes possible the economical use of material, for such an armature core may be tape wound, which considerably reduces the amount of material wasted as compared to conventional flat punched laminations where the center portion is usually wasted.

A further advantage is that the field iron may form a substantial part of the machine's static housing structure, thereby reducing weight and cost.

The finger or disc-type rotor configuration permits the use of a simple overhung shaft construction where that is desired.

The particular rotor construction permits the use of the shaft as part of the field flux path, thereby saving material and reducing weight and cost.

The helical wound field coil configuration shown eliminates end turns, thereby improving performance and reducing weight and wattage loss.

It is noted that the toroidal stator armature cores are preferably spirally wound even though the core is not used as the field winding as it is in some embodiments. It is preferable also that the magnetic material of the armature core be grain oriented, that is, have its grain oriented in the direction of flux flow.

The finger or disc-type rotor configuration lends itself to acting as a cooling fan.

By use of the finger or disc-type rotor, balanced magnetic forces, acting axially on the rotor, may be obtained by proper design considerations, if such balancing of magnetic forces is desirable.

Low inertia or high inertia rotors can be provided to meet given requirements, by use of the disc-type rotor construction in a very economical manner in terms of weight and cost, as compared with the use of a radial type alternator, that is, where the essential operating air gap is radial.

In many instances, the use of the disc-type rotor configuration permits the avoidance of a separate cooling fan in those cases where air-cooling is a requirement; inasmuch as the disc construction itself can be used as a fan.

What is claimed is:

1. A brushless dynamoelectric machine comprising: a winding-free rotor having a disc with an axis of rotation and provided with a face containing magnetic material lying in a plane substantially perpendicular to the axis of rotation, said magnetic material extending incompletely, but to a substantial extent, around the axis of rotation, a stationary armature located adjacent and juxtaposed to the face of the disc, said armature having a core of magnetic material extending concentrically and completely around the axis of rotation and having an armature winding provided with means for connection with equipment external of the machine and having a face also substantially perpendicular to said axis of rotation, and juxtaposed to the disc face to which it is adjacent with an axial air gap between the disc face and the armature face, stationary means comprising magnetic material forming parts of a path for magnetic flux, said path passing through the magnetic material of the rotor disc and through the armature core in the axial direction and through said stationary means, and then across a gap to the magnetic material of the disc to complete the magnetic circuit, and a field winding magnetically related to said means whereby flux passes through said path.

2. A machine according to claim 1 in which the rotor disc contains a plurality of magnetic poles, and there is a magnetic circuit for each pole.

3. A machine according to claim 1 in which the magnetic material of the rotor disc is arranged as a unit.

4. A machine according to claim 1 in which the magnetic material of the rotor disc is all of one polarity.

5. A machine according to claim 1 in which the magnetic material of the rotor disc is arranged as a finger means.

6. A machine according to claim 1 in which the magnetic material of the rotor disc comprises a plurality of fingers joined together.

7. A brushless dynamoelectric machine comprising: a winding-free rotor having a pair of discs each with an axis of rotation and provided with a face containing magnetic material lying in a plane substantially perpendicular to the axis of rotation, said magnetic material extending incompletely, but to a substantial extent, around the axis of rotation, a stationary armature located adjacent and juxtaposed to the face of each disc, the two discs being located between the two armatures, each armature having a core of magnetic material extending concentrically and completely around the axis of rotation and having an armature winding provided with means for connection with equipment external of the machine and having a face also substantially perpendicular to said axis of rotation and juxtaposed to said disc face to which it is adjacent, with an axial air gap between the armature face and the adjacent disc face, stationary means comprising magnetic material forming parts of a pair of closed paths for magnetic flux, one of said paths passing through the magnetic material of one of the rotor discs and its respective armature core and the other path passing through the magnetic material of the other of said rotor discs and the other of said armature cores, and a field winding means magnetically related to said stationary means, whereby when said field winding means is energized magnetic flux is created through said paths and the flux between the discs and the respective armatures across the respective air gaps rotates with rotation of the rotor and thereby cuts said armature windings.

8. A brushless dynamoelectric machine comprising: a winding-free rotor having an axis of rotation and provided with a face containing magnetic material and lying in a plane substantially perpendicular to said axis of rotation, a stationary armature with a core of magnetic material extending concentrically and completely around the axis of rotation and having an armature winding provided with means for connection with equipment external of the machine and having a face also substantially perpendicular to said axis of rotation and juxtaposed to said face of the rotor with an axial air gap between said rotor face and said armature face, said armature winding containing conductors which extend transversely across a concentric circle passing through them so that said armature conductors can be cut by a rotating flux, stationary means comprising magnetic material and a stationary field winding magnetically related to said stationary means, said rotor face containing magnetic material at least part of which is juxtaposed to the armature face and extends incompletely, but partially, around the axis of rotation, so that it is part of a closed path for flux existing through said magnetic material of the armature core and of the rotor and across the air gap when current flows in said field winding, the magnetic material of said rotor being all in one polarity, and the flux of said path between said rotor and armature across said air gap rotates with rotation of the rotor and thereby cuts said armature winding.

9. A brushless dynamoelectric machine comprising: a winding-free rotor having an axis of rotation and provided with a face containing magnetic material and lying in a plane substantially perpendicular to said axis of rotation, a stationary armature with a core of magnetic material extending concentrically and completely around the axis of rotation and having an armature winding provided with means for connection with equipment external of the machine and having a face also substantially perpendicular to said axis of rotation and juxtaposed to said face of the rotor with an axial air gap between said rotor face and said armature face, said armature winding containing conductors which extend transversely across a concentric circle passing through them so that said armature conductors can be cut by a rotating flux, the armature core being in the form of a toroid located concentrically with reference to the axis of rotation and the core comprising a helical winding of a ribbon of magnetic material with insulation between adjacent turns of the helical winding, whereby the helical winding acts as a field winding, said rotor face containing magnetic material at least part of which is juxtaposed to the armature face and extends incompletely, but partially, around the axis of rotation, so that it is part of a closed path for flux existing through said magnetic material of the armature core and of the rotor and across the air gap when current flows in said field winding, all the magnetic material of the rotor being connected together, and the flux of said path between said rotor and armature across said air gap rotates with rotation of the rotor and thereby cuts said armature winding.

References Cited by the Examiner

UNITED STATES PATENTS

| | | | |
|---|---|---|---|
| 1,702,755 | 2/1929 | Weydill | 310—105 |
| 2,550,571 | 4/1951 | Litman | 310—268 |
| 2,760,093 | 4/1956 | Button | 310—156 |
| 2,820,915 | 1/1958 | Mathews | 310—168 |
| 2,824,275 | 2/1958 | Kober | 310—268 |
| 2,897,387 | 7/1959 | Welter | 310—268 |
| 2,993,135 | 7/1961 | Henry-Baudot | 310—268 |

MILTON O. HIRSHFIELD, *Primary Examiner.*

MAX L. LEVY, *Examiner.*

D. F. DUGGAN, *Assistant Examiner.*